United States Patent [19]
Johansson

[11] 3,953,046
[45] Apr. 27, 1976

[54] FOLDING SPORT STROLLER OR THE LIKE

[75] Inventor: Leif Johansson, Bredaryd, Sweden

[73] Assignee: Baby Bjorn AB, Solna, Sweden

[22] Filed: Jan. 27, 1975

[21] Appl. No.: 544,409

[30] Foreign Application Priority Data
May 17, 1974 Sweden .............................. 7406620

[52] U.S. Cl. .............................................. 280/644
[51] Int. Cl.² ......................................... B62B 11/00
[58] Field of Search ........................ 280/36 B, 41 A

[56] References Cited
UNITED STATES PATENTS

| | | | |
|---|---|---|---|
| 2,341,117 | 2/1944 | Reinholz | 280/36 B |
| 3,330,575 | 7/1967 | Boudreau | 280/36 B |
| 3,443,823 | 5/1969 | Perego | 280/36 B |
| 3,797,848 | 3/1974 | Burnham | 280/36 B |

*Primary Examiner*—Robert R. Song
*Attorney, Agent, or Firm*—Phillips, Moore, Weissenberger Lempio & Strabala

[57] ABSTRACT

A folding sport stroller, comprising at least one pair of angular supporting legs pivotally mounted in relation to one another, in the supporting end of which wheels, pivoted on wheel axles at right angles to the supporting legs, are arranged, the first supporting leg, for instance the rear one, being extended upwards beyond the pivoting shaft between the legs, the extension carrying a blocking lever pivoted on it, which has a locking part in engagement with a locking device adjacent the other leg, when the stroller is in ready to use-state so that the extension of the supporting leg, the portion of the blocking lever between said extension and the locking part as well as the part of the other supporting leg between the locking device and its pivot in the first leg, in the said state of the stroller, generally form a triangle-shaped locking construction maintaining the supporting legs in a fixed position in relation to each other.

14 Claims, 12 Drawing Figures

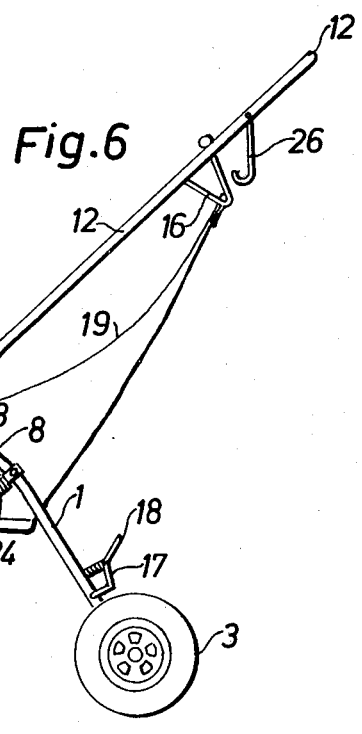
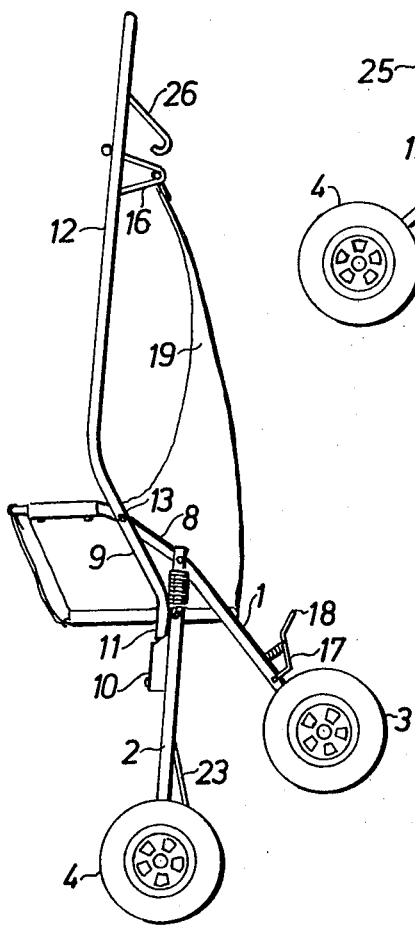
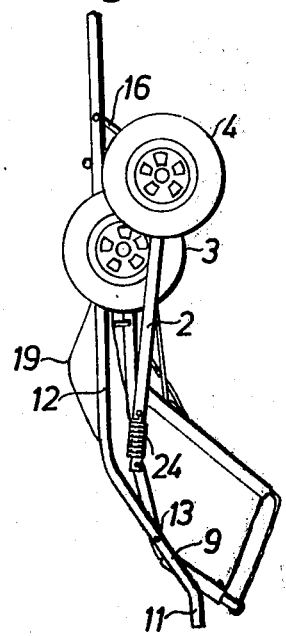

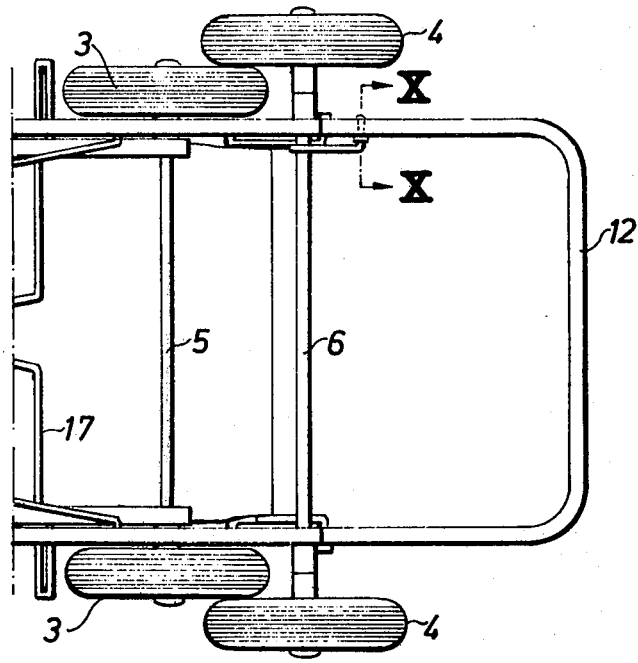
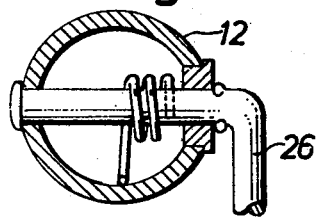
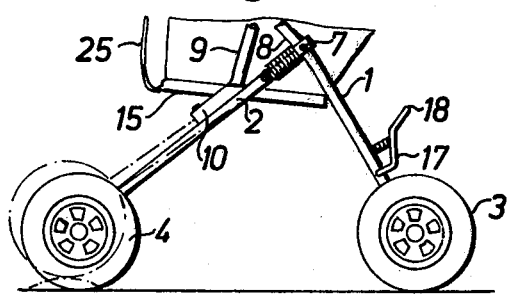
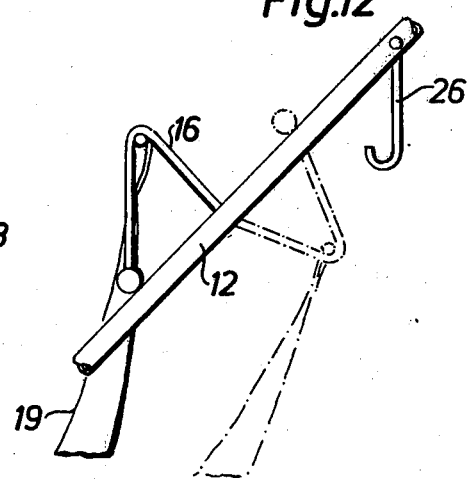

FOLDING SPORT STROLLER OR THE LIKE

BACKGROUND OF THE INVENTION

This invention relates to folding constructions of metal or steel tubes, particularly to folding sport strollers etc., comprising at least one pair of folding angular supporting legs having supporting elements at their supporting ends, for instance wheels pivoted on wheel axles set up at right angles to said supporting legs, whereby the first supporting leg, for instance the back one, has an upward extension beyond the folding axle between the legs.

It is the fixation of the mutual position of the supporting legs, the stroller being ready to use, which is essential, since the question is to obtain a construction of low weight, easy to manufacture, to handle and to transport.

In a known construction the angular supporting legs have been linked together below their mutual pivot by means of a double link, which, when the angular supporting legs are unfolded, forms a continuous drag link, but which when the angular supporting legs are to be collapsed, is folded in half so that each of the link parts is folded together with the angular legs. Such a construction is very light and easy to manufacture, but in handling it requires both hands to be free in order to handle both the angular supporting legs and the fixing links as desired.

In another construction a trapezoid linkage is arranged above the bearing point of the angular supporting leg, which, the supporting legs being unfolded, are made to function as a triangle formed supporting construction by means of extra locking rings, but which, when the angular supporting legs are to be folded by pulling away the rings, return to a trapezoid linking system which is collapsed together with the angular supporting legs.

Even for handling this construction both hands must be free. Besides, such a construction is difficult to manufacture and to utilize and finally it is made heavy by the multiplicity of links.

SUMMARY OF THE INVENTION

The object of the present invention is to avoid these disadvantages and consists mainly therein, that an extension of the first supporting leg carries a blocking lever pivoted therein, the lever having a locking part which, when the stroller is ready for use, is in engagement with a locking device adjacent the other leg in such a way that the extension of the supporting leg, the portion of the blocking lever between said extension and the locking part together with the part of the other supporting leg between the locking device and its pivot in the first leg, in the said state of the stroller, form a mainly triangle-formed locking structure, locking the supporting legs in their mutual positions. The locking device on the other leg suitably consists of a locking socket or the like and the locking part of the blocking lever of a bent free end of said lever, to be introduced into the locking socket, when swinging the rear supporting leg in relation to the front leg for coupling them together. In order to facilitate the operating of the blocking lever, the lever and the handle of the stroller conveniently consist of a single piece.

In a further embodiment of the invention the sport stroller or the like contains two pairs of angular supporting legs, the legs of each pair being swingable in relation to each other; hereby it is suitable that the ends of the two rear angular supporting legs opposite the back wheel are joined together, so as to form a mainly U-shaped tube serving as a handle for the child.

Hereby it is suitable also that the blocking levers are extended beyond their pivot in the extension of the first supporting leg and that the extensions are joined together so as to form a U-shaped bent stroller handle.

In this way a very light and handy construction is obtained, manipulated only by one hand and one foot. One has only to seize the handle of the folded stroller and to press simultaneously one foot on the rear wheel axle. As soon as the two pairs of wheels begin to move apart, the bent free end of the blocking lever in question, being the locking part, will be introduced into the locking socket of the corresponding front angular supporting leg, until the main part of the blocking lever rests against the edge of the locking socket, whereby the desired triangle locking structure for each pair of angular supporting legs is formed.

According to a further embodiment of the invention the back angular supporting leg is bent inwards between the mutual pivotal shaft of the angular supporting legs and the pivot between said back angular supporting leg and the blocking lever, so that, on one hand, the introducing of the locking part of the blocking lever into the locking socket is facilitated, as the front and back wheels are pushed away from each other, and, on the other hand, the back wheels can be lodged above the axles, when the stroller is folded. Hereby it is suitable that the locking part of the blocking lever forms an obtuse angle with the blocking lever, the length of which being such that the bent portion between the lever and the locking part as well as the locking part itself, when turning the blocking lever on its pivot, will slide along the other angular supporting leg and will be introduced into the locking socket so as to engage said socket.

In order to be able to lodge the back wheels of the stroller in folded state between the front wheels, the distance between the back wheels suitably is less than the distance between the front wheels.

BRIEF DESCRIPTION OF THE DRAWINGS

The invention will now be described more in detail in connection with the enclosed drawings, on which the figures show the following.

DESCRIPTION OF THE PREFERRED EMBODIMENT

Figure 1:
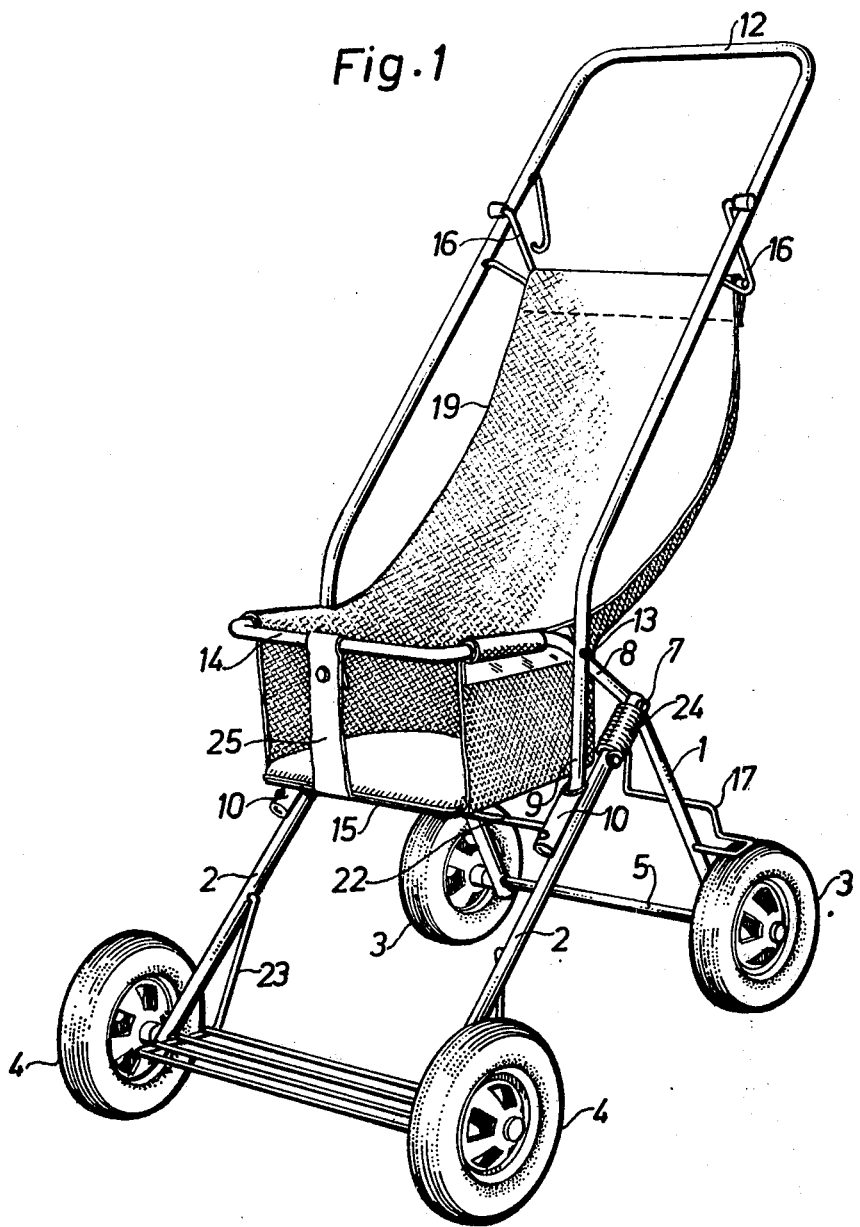
FIG. 1 an oblique front view in perspective of an embodiment of a stroller according to the invention, FIG. 2 the same embodiment of the stroller in an oblique perspective view from the back, FIG. 3 a section of the stroller seat, taken along the line III—III of FIG. 2, FIG. 4 a section of the one elbow rest taken along the line IV—IV of FIG. 2, FIG. 5 a side view of the brake shown in FIG. 2, FIG. 6 a side view of the stroller at the beginning of the folding process, FIG. 7 also a side view of the stroller, the folding process having progressed somewhat, FIG. 8 a side view of the completely collapsed stroller and FIG. 9 a part of the collapsed stroller taken from above, FIG. 10 a detail of the mounting of the locking hook, taken along the line X—X of FIG. 9, FIG. 11 the suspension function of the stroller and FIG. 12 an angular frame mounting for the supporting bar of a fabric seat.

The embodiment of the invention illustrated on the drawings shows a folding stroller. Its main part is formed by a bogie with a pair of front wheels 4 and a pair of back wheels 3, which by means of the axles 6 and 5 are rotatably fixed to the supporting ends of the pairs of angular supporting legs 2, 1. As appears from FIGS. 1, 2, 6, 7, 8 and 9, the rear legs have been denoted throughout by 1 and the front legs by 2. The front angular supporting leg 2 is pivoted on the rear angular supporting leg 1 by means of a pivot shaft 7. In all the figures the other mutually corresponding parts of the stroller have been marked throughout with the same reference numerals.

The rear angular supporting legs 1 have an extension 8 above the pivot 7 and these extensions are joined into a common U-shaped handle 14 for the child. By welding the wheel axles 5 and 6 to the lower parts of the supporting legs and by manufacturing both of the rear supporting legs and their extension 8 in a single piece forming a U-shaped handle 14, the stroller obtains a solid bogie or underframe construction, which in the represented embodiment has been additionally strengthened by a cross-bar 22 between both of the front supporting legs 2 on the level of the seat 15.

In the somewhat forward bent extensions 8 of the rear supporting legs, close by the place where said extensions overgo to a U-shaped arm or handle 14, blocking levers 9 are mounted on each extension by means of a pivot 13, levers which in the shown embodiment in a backward and upward direction overgo to a U-shaped stroller handle 12. The free ends of the blocking lever 9 are bent in obtuse angle forming hereby locking parts 11, which, when the stroller is ready to use, engage in the locking socket 10 on the front angular supporting legs 2. The length of the blocking levers 9 is fitted so that the bent portion between the lever 9 and the locking part 11, as well as the locking part itself when pivoting the blocking lever on pivot 13 (which can be done manually by seizing the stroller 12 by one hand) will slide along the corresponding angular supporting leg 2 and thus be engaged into or disengaged from the locking socket 10.

When the locking part 11 and the locking socket 10 are engaged, i.e., when the stroller is in ready to use-state the extension of the supporting leg 8, the part of the blocking lever 9 between said extension 8 and the locking part 11 as well as the part of the other supporting leg 2 between the locking device 10 and its pivot in the first leg will form a mainly triangle shaped locking structure, maintaining the supporting legs 1 and 2 in their mutual positions.

By making the part of the other angular supporting leg 2, between the locking device 10 and the pivot 7 of the leg in the first leg 1, resilient, for instance by replacing a portion of said part with a spiral spring 24, the whole bogie can be made resilient, so as to make the stroller run pleasant. FIG. 11 shows how such a suspension functions.

The construction is eminently simple, compact and concise. It does not require such material and therefore becomes light and can thus profitably be made of steel, which makes it strong and reliable. In using steel a great distance between the front and the back axles is made possible and hereby considerable security is gained against forward- or backward-upsetting.

The handling is extremely uncomplicated. From the folded state, as shown in FIG. 8, the stroller can be put so as to be ready for use, as shown in FIG. 1, by lifting the handle 12 of the stroller with one hand, and by pressing simultaneously with one foot against the rear wheel axle 5. The stroller then passes through the different positions which are shown in FIGS. 7 and 6 to the position of FIG. 1, by pivoting the handle 12 with the blocking levers 9 in such a way that the locking part 11 is engaged in the locking socket 10 on each or both front supporting legs 2. Hereafter it is obvious that, when manually pressing the handle 12 downwards, a more and more steady engagement between the locking part 11 and the locking socket 10 is obtained.

Figure 3:
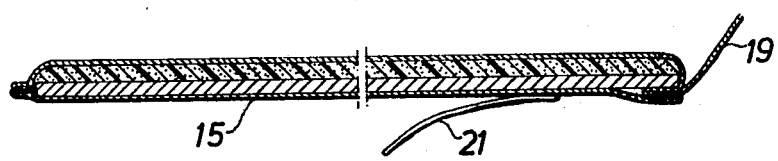
Figure 4:
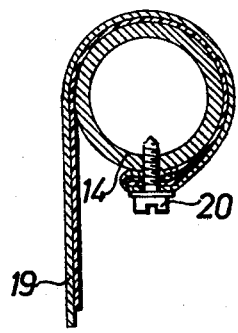
Figure 5:
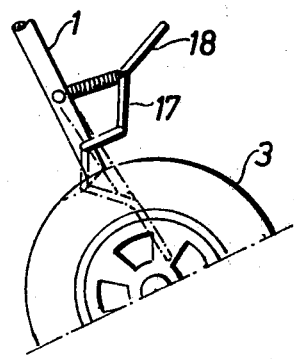

As already mentioned and as appears from FIGS. 1 and 6, the stroller seat 15 is suspended in the armhoop 14 by means of a fabric strip 25. The side parts and the back of the chair are formed by a fabric 19, the upper part of which is suspended on a bar being welded in the angular mountings 16, which are fixed in the side shanks of the stroller's handle 12. The angle mountings have two positions — one as the child is sitting and one as it is half-lying — and switching from one position to another is easy. The side parts of the fabric 19 are partly fastened on the underside of the stroller seat 15, see FIG. 3, partly wound around the elbow rest of the armhoop 14 and fastened with screws 20, as shown in FIG. 4.

Figure 2:
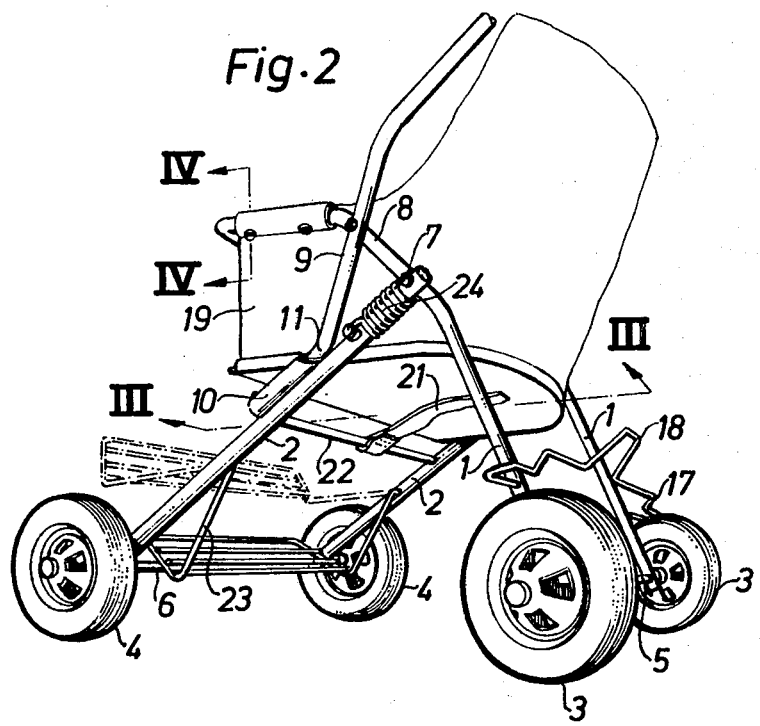

In order to maintain the seat 15 in place even when collapsed it is fastened to the cross-bar 22 by means of a fabric strip 21, see FIG. 2. The seat is placed exactly between the wheel axles and consequently the child's center of gravity lies mainly above the intersection of two diagonal lines between the pivot points of the four wheels.

The described construction can, in addition to child strollers, also be used for doll carriages, shopping carriages, office carriages, beach chairs, etc.

Although the described stroller is very stable and spacious for use, it requires very little space when collapsed, as appears from FIGS. 8 and 9.

The stroller is also provided with a simple foot rest 23, as shown in FIGS. 1 and 2, and also with a brake in the form of a wire yoke 17, see FIG. 2, which can be put into locking position against the back wheel 3 with a pressing yoke 18.

As shown in FIGS. 1 and 2, the back angular supporting legs 1 are bent inwards between the pivot 7 and pivot 13 of the blocking lever 9, which on one hand facilitates the introduction of the locking part 11 of the blocking lever 9 into the corresponding locking socket 10, when the front and back wheels are pulled away from each other, and which on the other hand makes it possible to lodge the back wheels above the axle 6 between the front wheels, when the stroller or the like is collapsed.

Another advantage of this construction is that the back wheels come into a half collapsed position, when the stroller is drawn backwards up stairs, whereby the wheels will work as ratchet wheels until the front wheels are pulled onto the stair in question, whereafter by pressing down the handle 12 engagement between the locking part 11 of the locking lever 9 and the corresponding locking socket 10 is obtained again and the same operation can be repeated on the next stair.

After having described the safe construction of the stroller and how to put it into ready to use-state the folding of said stroller will now be described.

As shown in FIG. 6, the stroller is folded by lifting slightly the handle 12 with one hand, whereby the locking part 11 of the blocking lever is disengaged from the locking socket 10, as indicated by an arrow P. FIG. 7 shows how this movement continues until the locking part 11 and the locking socket 10 come into complete disengagement from each other. Hereafter one has only to let the angular supporting legs 1 and 2 collapse and to move the wheels 3 and 4 towards the stroller handle by holding the handle with one hand and pressing up the wheel with one foot, until the stroller comes into the position shown in FIG. 8. The hook 26, which is resiliently pivoted in a side shankle of the handle 12, as appears from FIG. 10, has then snapped around the front wheel axle 6, as also shown in FIG. 9. As appears, the stroller is extremely compact when collapsed and requires very little space.

Although the invention has been described in connection with an embodiment of the same it can be arbitrarily varied within the scope of the appending claims.

What is claimed is:

1. A stroller comprising:
a pair of pivotally mounted legs, wheel means rotatably mounted to respective support ends of the legs, one of said legs extending upward beyond the pivot axis of the legs, a blocking lever pivotally mounted to said extension and defining a locking portion, a locking device fixed relative to the other leg and which may engage the locking portion, the extension, the portion of the blocking lever between said extension and the locking portion, and the portion of the other leg between the locking device and pivot axis of the other leg generally forming a triangle which maintains the legs in a fixed position relative to each other with the locking device engaging the locking portion.

2. The stroller according to claim 1 wherein the locking device comprises a locking socket, and the locking portion comprises the bent free end of the blocking lever which may be introduced into the locking socket.

3. The stroller of claim 2 wherein the locking socket is attached to and disposed parallel to the other leg between the pivot axis of the legs and the support end of the other leg.

4. The stroller of claim 3, and further comprising a stroller handle portion, defined by the blocking lever.

5. The stroller of claim 4 wherein the one leg is bent inward between the pivot axis of the legs and the pivot axis of the one leg and blocking lever, to facilitate introduction of the locking portion into the locking socket upon pulling apart of the wheels from each other, and whereby the wheel associated with the one leg is positioned inward of the wheel associated with other leg when the stroller is in a collapsed state.

6. The stroller of claim 5 wherein the locking portion of the blocking lever defines an obtuse angle with the blocking lever, the length of the locking portion being chosen so that, upon pivoting of the blocking lever relative to the one leg, the locking portion and bent portion adjacent the locking portion slide along the other leg and penetrate into engagement with the locking socket.

7. The stroller of claim 6 wherein the other leg defines a resilient leg portion.

8. The stroller of claim 7 wherein the resilient portion is positioned between the locking socket and the pivot axis of the legs.

9. The stroller of claim 1 wherein the other leg defines a resilient leg portion.

10. The stroller of claim 9 wherein the resilient portion is positioned between the locking device and the pivot axis of the legs.

11. The stroller of claim 8 and further comprising an arm portion defined by a further extension of the extended portion.

12. The stroller of claim 11 and further comprising a seat, associated with the arm portion, and mounting means connecting the seat and handle portion, the mounting means being movable to a first position defining a first seat position, and movable to a second position defining a second seat position.

13. The stroller of claim 12 and further comprising brake means associated with the one leg and wheel rotatably mounted thereto, comprising a pressing element movable to press down against the wheel associated with the one leg to lock said wheel in a braking position.

14. A stroller according to claim 13 and further comprising hook means mounted to the handle portion and positioned to interact with the one leg to selectively maintain the stroller in a collapsed state.

* * * * *